W. S. STONE.
Improvement in Horse-Powers.
No. 132,033. Patented Oct. 8, 1872.
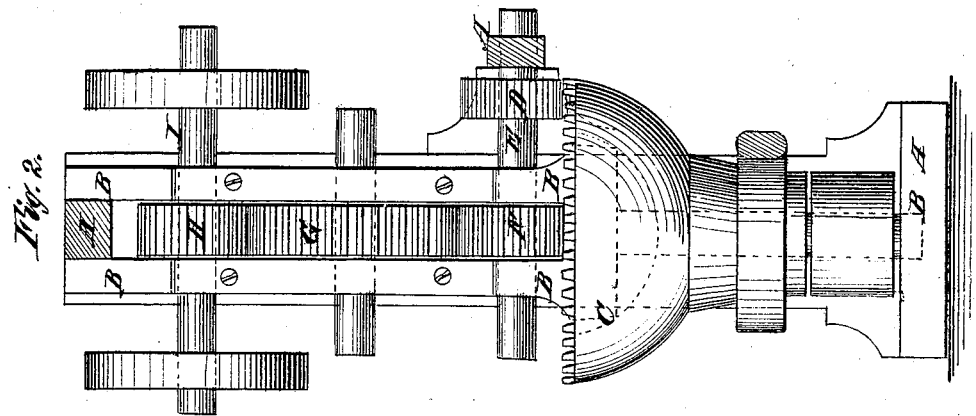
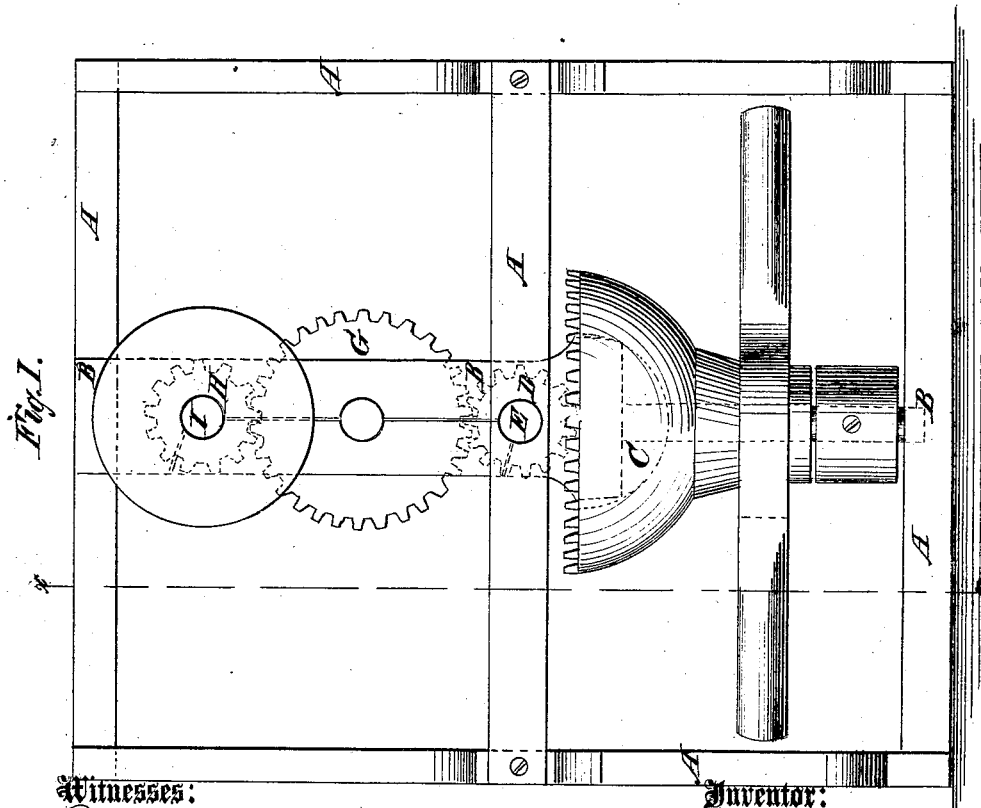

UNITED STATES PATENT OFFICE.

WILLIAM S. STONE, OF PITT'S POINT, KENTUCKY.

IMPROVEMENT IN HORSE-POWERS.

Specification forming part of Letters Patent No. 132,033, dated October 8, 1872.

*To all whom it may concern:*

Be it known that I, WILLIAM S. STONE, of Pitt's Point, in the county of Bullitt and State of Kentucky, have invented a new and useful Improvement in Horse-Power, of which the following is a specification:

Figure 1 is a front view of my improved horse-power. Fig. 2 is a side view of the same, partly in section, through the line *x x*, Fig. 1.

Similar letters of reference indicate corresponding parts.

My invention has for its object to furnish an improved horse-power, simple in construction, effective in operation, and durable in use, and which shall not be liable to get out of order, and will require a comparatively small amount of power to run it; and it consists in the construction and combination of various parts, as hereinafter more fully described.

A represents any suitable frame-work, to which is attached, and by which is supported, a vertical shaft, B. Upon a journal formed upon the lower part of the shaft B revolves a crown or bevel-gear wheel, C, to the hub of which is attached the sweep or sweeps to which the draft is applied. The teeth of the wheel C mesh into the teeth of the small gear-wheel D attached to the short shaft E, which revolves in bearings in the frame A and in the shaft B. To the shaft E is also attached a small gear-wheel, F, which is placed in a slot formed in the upper part of the shaft B. G is a gear-wheel placed in the slot in the shaft B, and pivoted to the said shaft. The teeth of the gear-wheel G mesh into the teeth of the gear-wheel F, and also into teeth of the gear-wheel H placed in the upper part of the slot in the upper part of the shaft B, and attached to the shaft I, which passes through and revolves in bearings in the shaft B. The shaft I is the driving-shaft from which motion is taken to the machinery to be driven by pulleys and bands, or by other well-known means. In some cases the intermediate gear-wheel G need not be used, the teeth of the gear-wheel F meshing directly into the teeth of the gear-wheel H.

When the machine is to be used as a ground-power the gearing is simply inverted, bringing the driving-shaft I down to or beneath the surface of the ground, as circumstances may require. In this case the intermediate gear-wheel G will not be required.

Having thus described my invention, I claim as new and desire to secure by Letters Patent—

The combination, with a sweep crown-wheel, B, revolving on a vertical shaft, and wheels F G H, that communicate motion to the machine drive-shaft I, of a drive-pinion, D, arranged on a spindle resting upon a collar-beam suspended from the girders of frame A, as and for the purpose described.

WILLIAM S. STONE.

Witnesses:
  J. L. COOK,
  ISAAC D. STONE.